US012544305B1

(12) United States Patent
Alkhaled

(10) Patent No.: US 12,544,305 B1
(45) Date of Patent: Feb. 10, 2026

(54) PILL STORAGE SYSTEM

(71) Applicant: Ghaida Alkhaled, Beverly Hills, CA (US)

(72) Inventor: Ghaida Alkhaled, Beverly Hills, CA (US)

( * ) Notice: Subject to any disclaimer, the term of this patent is extended or adjusted under 35 U.S.C. 154(b) by 0 days.

(21) Appl. No.: 18/641,148

(22) Filed: Apr. 19, 2024

Related U.S. Application Data

(60) Provisional application No. 63/461,865, filed on Apr. 25, 2023.

(51) Int. Cl.
*A61J 1/03* (2023.01)
*A61J 1/14* (2023.01)
*A61J 7/00* (2006.01)

(52) U.S. Cl.
CPC ............... *A61J 1/03* (2013.01); *A61J 1/1412* (2013.01); *A61J 7/0069* (2013.01)

(58) Field of Classification Search
CPC .. A61J 1/03; A61J 1/035; A61J 1/1412; A61J 7/0069; B65D 5/38
USPC .......................................... 206/538, 528, 818
See application file for complete search history.

(56) References Cited

U.S. PATENT DOCUMENTS 5,005,697 A * 4/1991 Jimbo .................... A45C 13/02 206/823
6,625,518 B2 * 9/2003 Depeursinge .......... G16H 20/13 700/242
7,097,037 B1 * 8/2006 Keffeler ............. B65D 21/0202 206/532
7,793,785 B2 * 9/2010 Keffeler .................... A61J 7/04 206/532
7,854,326 B1 * 12/2010 Beckett ................. A61J 7/0084 206/534
8,844,724 B2 * 9/2014 Andrews ............... A61J 7/0084 206/534
D897,831 S * 10/2020 Hawry ........................... D9/414
D919,283 S * 5/2021 Guo ............................ D3/203.3
11,191,702 B2 * 12/2021 Zonana ................. A61J 7/0084
D940,450 S * 1/2022 Chen ........................... D3/203.3
D948,865 S * 4/2022 Tarafder ...................... D3/203.3
D966,698 S * 10/2022 Chen ........................... D3/203.1
D1,006,432 S * 12/2023 Chen ........................... D3/203.3
D1,019,118 S * 3/2024 Wang .......................... D3/203.2
2003/0038053 A1 * 2/2003 Bramen ............. B65D 83/0445 220/524
2014/0251863 A1 * 9/2014 Priebe ........................ A61J 1/03 206/534
2014/0262884 A1 * 9/2014 Priebe .................. A61M 5/321 206/538
2019/0224077 A1 * 7/2019 Stein ...................... G08B 21/24
2020/0115102 A1 * 4/2020 Hawry ...................... A61J 1/03
2022/0175618 A1 * 6/2022 Wang ........................ A61J 1/03
2023/0372205 A1 * 11/2023 Bonilla ................. A61J 7/0454

* cited by examiner

*Primary Examiner* — Steven A. Reynolds
(74) *Attorney, Agent, or Firm* — Plager Schack LLP; Mark H. Plager; Naomi Mann

(57) ABSTRACT

A pill storage system comprises multiple containers which may be assembled into a compact unit to be collectively carried. In some embodiments, the system may comprise a tray configured to hold the multiple pill containers in compact linear alignment, and a sleeve configured to slide over the tray and compartments to encase the assembly.

10 Claims, 4 Drawing Sheets

PILL STORAGE SYSTEM

RELATED APPLICATION

This application claims benefit to U.S. Provisional Application No. 63/461,865 filed Apr. 25, 2023, which is incorporated by reference herein in its entirety.

BACKGROUND

The present disclosure relates generally to containers for pill storage. Conventional pill bottles may be inconvenient to carry (e.g., when traveling). Additionally, many individuals taking pills on a regular basis may find it difficult to remember to take their pills each day. As such, an improved pill storage system which addresses the above-mentioned issues is desirable.

SUMMARY

According to various embodiments, disclosed is a pill storage system comprising multiple containers which may be assembled into a compact unit to be collectively carried. In some embodiments, the device may comprise a tray configured to receive the multiple pill containers, and a sleeve configured to slide over the tray and compartments contained therein. In some further embodiments, the compartments may be magnetically attachable to the tray.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

According to various embodiments as depicted in FIGS. 1-8 disclosed is a pill storage system 100 comprising an assembly which includes multiple pill containers 13 and a tray 12 configured to hold containers 13, wherein each of containers 13 may be individually separated from or assembled to the tray. In further embodiments, pill storage system may comprise a sleeve 10 configured to slide over the tray and containers 13 held within tray 12.

Figure 1:
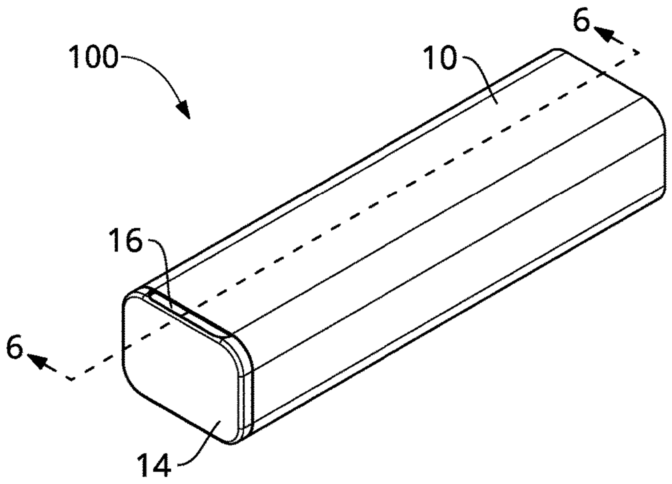
FIG. 1 is a perspective view showing components of a pill storage system assembled into a compact unit housed within a sleeve component of the system.
Figure 2:
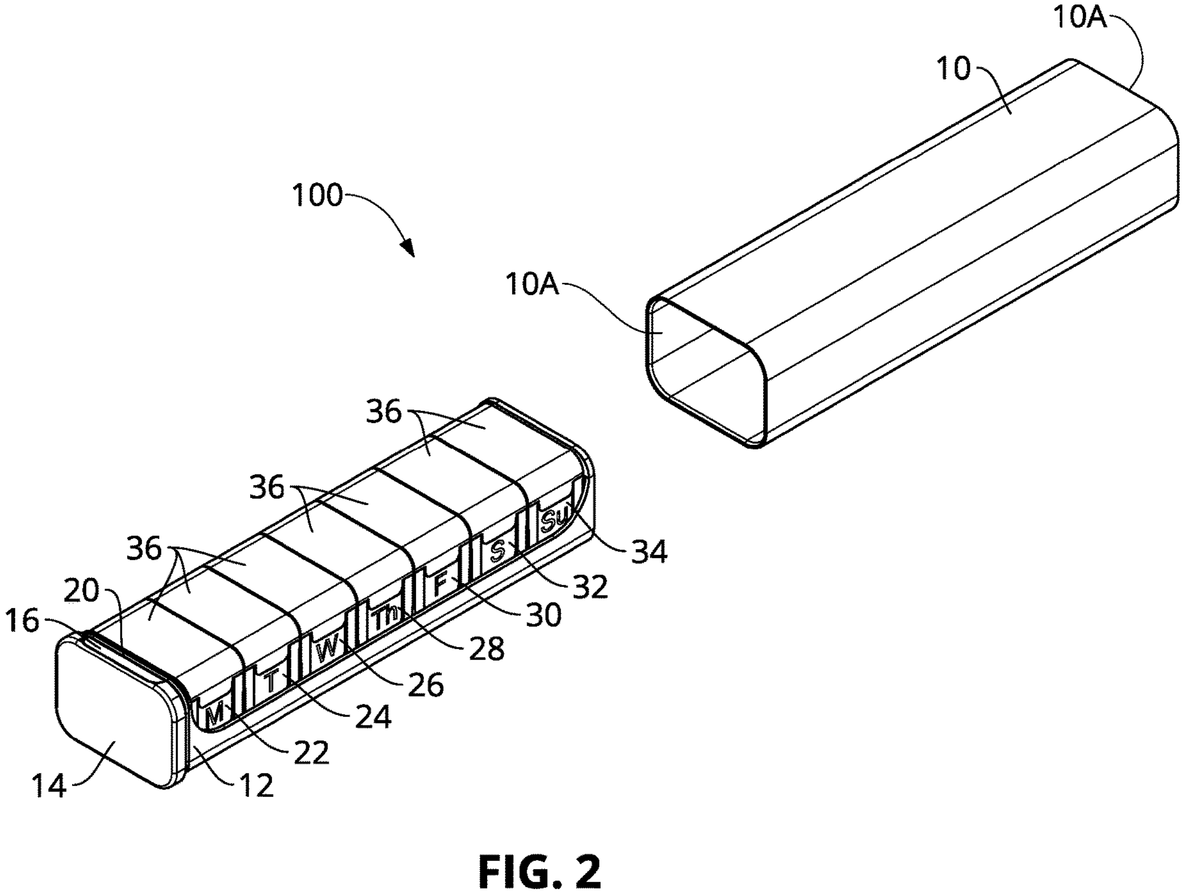
FIG. 2 is a perspective view showing a tray and pill containers of pulled out of the sleeve.
Figure 3:
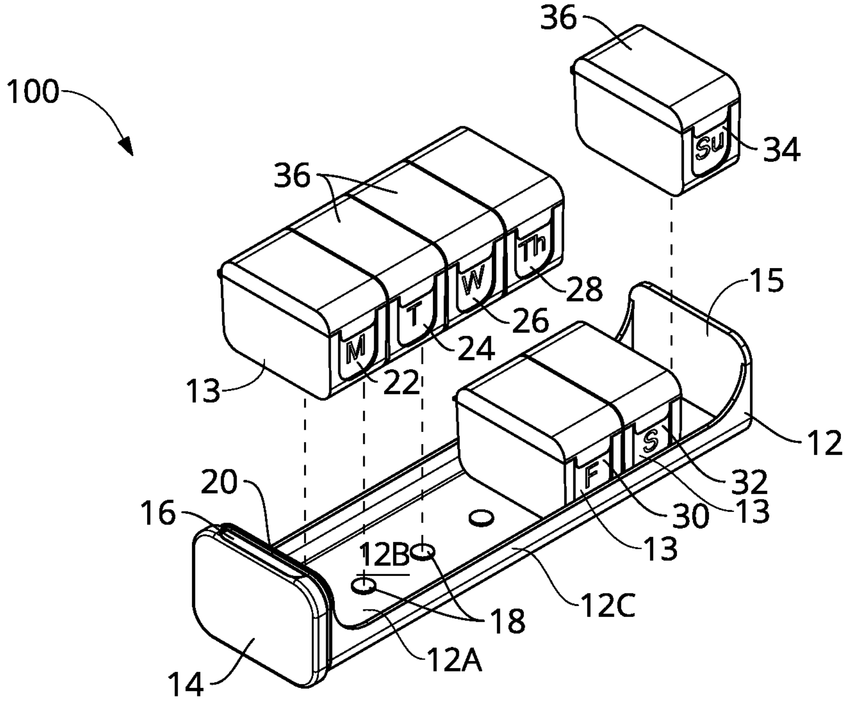
FIG. 3 is a top perspective view of the tray with several containers removed.
Figure 4:
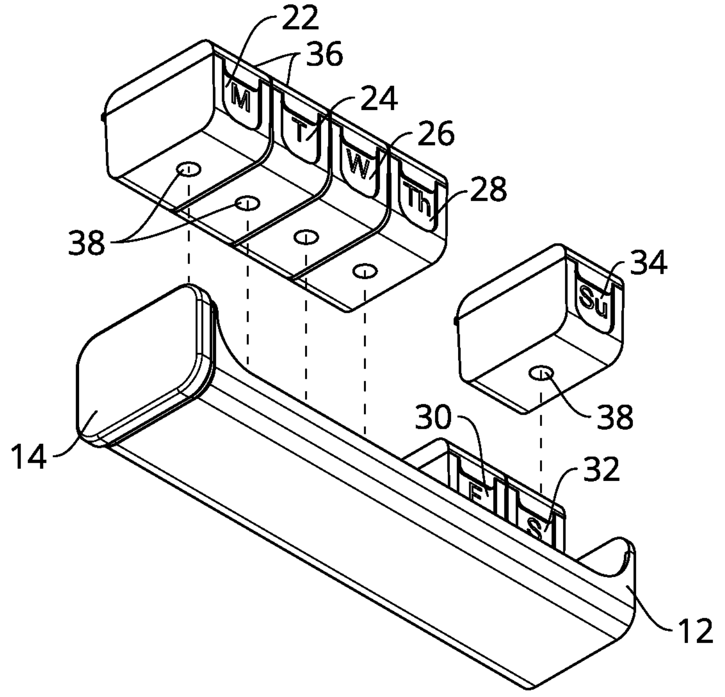
FIG. 4 is a bottom perspective view similar to that of FIG. 3.
Figure 5:
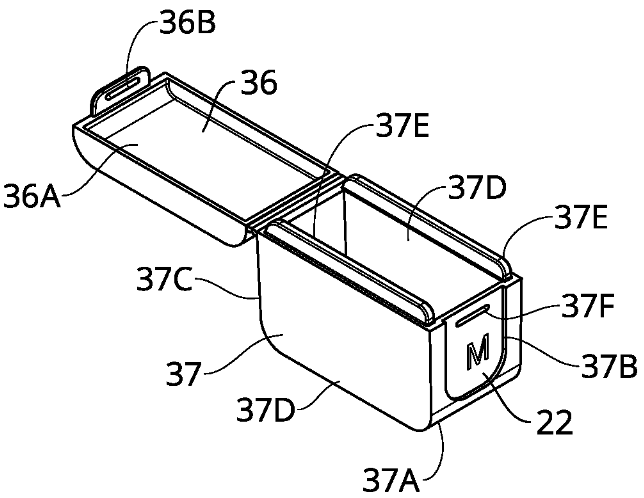
FIG. 5 is a detailed view of a single container shown opened.
Figure 6:
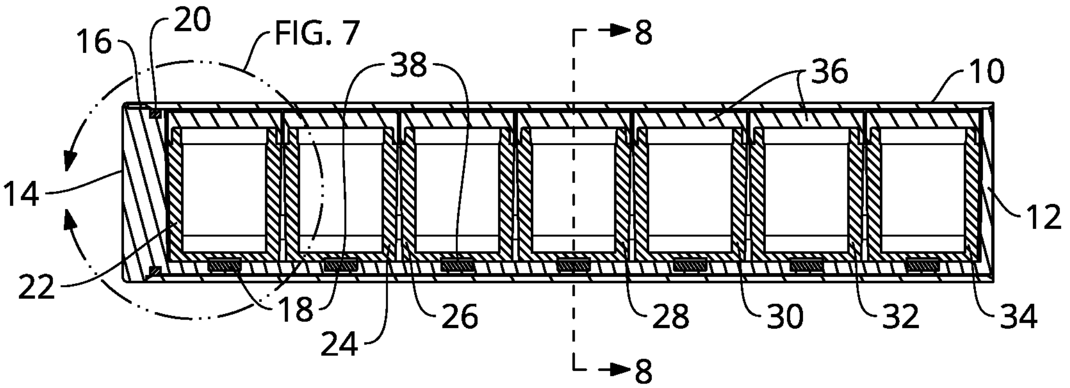
FIG. 6 is a section view taken along line 6-6 in FIG. 1.
Figure 7:
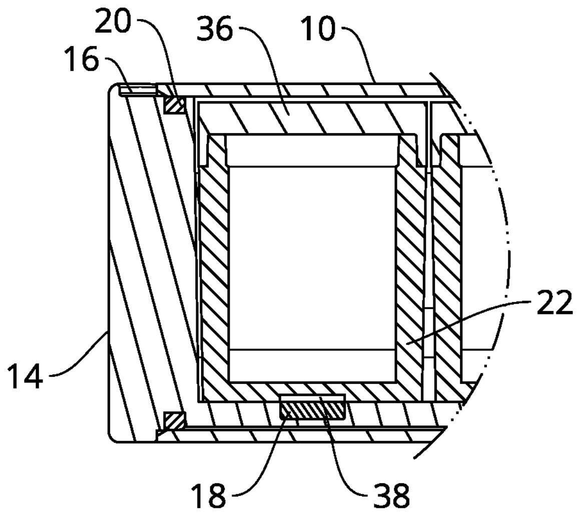
FIG. 7 is a detailed section view from FIG. 6.
Figure 8:
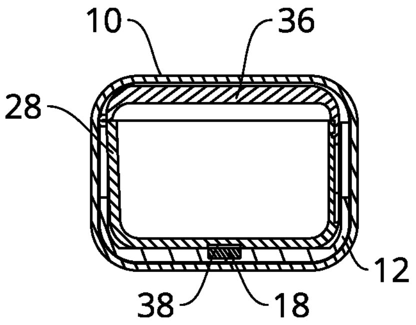
FIG. 8 is a section view taken along line 8-8 in FIG. 6.

In certain embodiments, containers 13 may each have an essentially rectangular prism configuration, and may include a main container body 37 comprising a bottom wall 37A, a front wall 37B, a back wall 37C, side walls 37D, and a top lid 36 configured to enclose main container body 37. It shall be appreciated that the term rectangle/rectangular prism as used herein also encompasses a square/box, as well as rounded corners or edges for an essentially rectangular geometry. In certain embodiments, lid 36 may be rotationally coupled and/or hinged to the top of back wall 37C. According to an exemplary embodiment, lid 36 may include a top wall 36A and side walls that extend downwardly from top wall 36A which are configured to enclose over top side wall extensions 37E of main container body 37. In further embodiments, lid 36 and container body 37 may be provided with a releasable closure mechanism. In one embodiment, the closure mechanism may comprise a button or tab 36B coupled to a front edge wall of lid 36, which is configured to insert into a slot 37F in front wall 37B of main container body 37, as best depicted in FIG. 5. Tab 36B may lockably engage within slot 37F, and may be released using finger force to push out the tab. Thus, tab 36B may be pressed to pop open the lid, and snaps back into a locked position. It shall be appreciated that different closure systems for the containers, as currently known or may become known, may be used in alternate embodiments. It shall be appreciated that various types of lids, caps, etc. may be provided within container 13 in alternate embodiments. For example, container 13 may be provided with a slidable lid, magnetic lid, screw on cap, etc. in alternate embodiments. It shall be appreciated that container 13 may have different sizes, dimensions, geometries, etc. in alternate embodiments.

In certain embodiments, pill storage system 100 may include 7 containers 13; one for each day of the week. Each container 13 may further be labeled and/or designated for a particular day. For example, containers for use in English speaking countries such as the US, may include a first small container 22, with an "M" label, a second small container 24 with a "T" label, a third small container 26 with a "W" label, a fourth small container 28 with a "Th" label, a fifth small container 30 with an "F" label, a sixth small container 32 with an "S" label, and a seventh small container 34 with an "Su" label. In alternate embodiments, containers may be numbers from 1-7, which may designate the days of the week in certain countries. It shall be appreciated however, that system 100 may comprise any number of containers 13 which may be unlabeled, or may include other label information depending on the specific needs of the user, in alternate embodiments. For example, system 100 may include seven containers for the days of the week and at least one additional container for other items. Some none limiting examples for alternate types of container labeling information may include pill identification labels (e.g., "Ibuprofen," "vitamin C", "antibiotic", etc.), labels identifying individuals who need to take the pill, labels indicating day/night or specific time of day when a pill needs to be taken, etc. According to an exemplary embodiment, the labels may be provided on front wall 37B of each container 13 as depicted in the figures. It shall be appreciated however, that the labeling may be provided on different locations/walls within container 13, including the lid, in alternate embodiments. In some embodiments, the labeling may be etched into the container. However, in other embodiments, system 100 may provide means for allowing the user to label each container. This may include, for example, stick on labels, magnetic labels, a label retaining window, etc.

In certain embodiments, tray 12 and sleeve 10 may have an elongated design. Additionally, sleeve 10 may have an essentially rectangular cross section. Tray 12 may further include a bottom seat 12A configured to receive containers 13. In one embodiment, bottom seat 12A may comprise a bottom wall 12B and a rim 12C which extends upwards from front and back edges of the bottom wall as shown. In further embodiments, tray 12 may include a first bracketing side wall 14 and a second bracketing side wall 15 that extend upwards from opposite side edges of bottom wall 12B. In embodiments, rim 12C and side walls 14, 15 extend perpendicularly from bottom wall 12B. Additionally, a straight line distance between front and back edges of the bottom wall 12B (also referred to as the width of bottom wall 12B) corresponds to the bottom wall width of each of containers 13, and the length of seat 12A may correspond to the summed length of the total number of containers 13 of system 100 when placed within the seat, side by side (which may be 7 containers according to the above-described embodiment). As such, rim 12C and side walls 14, 15 function cooperatively with bottom wall 12B to form a cup like structure for snuggly receiving containers 13. In certain embodiments, sleeve 10 comprises opposite open ends 10A and is configured to slipover tray 12 and to securely encase containers 13 held within the tray. In certain embodiments, tray 12 including containers 13 is sized to snuggly slip into sleeve 10. In some embodiments, rim 12C may extend only a slight distance upwards, which enables a label placed on front walls 13B of container 13 to be seen when containers 13 are assembled to tray with sleeve 10. Side walls 14, 15 are configured to bracket containers 13 placed within tray 12 from the side ends to retain the containers within the tray. In some embodiments, the height of side walls 14, 15 may correspond to the side wall height of the containers 13, but not necessarily so. In further embodiments, side walls 14, 15 are configured to block open ends 10A in sleeve when assembled. In one embodiment, first side wall 14 is slightly larger than second side wall 15, such that second side wall 15 (along with tray 12 and containers 13) may be passed through sleeve 10 while first side wall 14 caps and blocks sleeve 10 from passing. In further embodiments, a periphery of sleeve 10 snuggly frames second side wall 15 and is flush with the side wall face, while a periphery of first side wall 14 is flush with the sleeve body. This provides an assembled unit which is an essentially continuous/uninterrupted piece. In some embodiments, a slot 16 may be provided at the top of the first side wall periphery to facilitate a user in pulling the sleeve out from the tray. In some further embodiments, an inner ring 20 which may be made of a high friction material, may be provided on an inner side of first side wall 14, and is configured to situate against the inner walls of sleeve 10 to prevent sleeve 10 from sliding away from tray 12.

As such, the 7 containers may be retained within tray 12, and sleeve 10 may be slid over to tray and containers to provide an enclosed rectangular housing for the compartments. It shall be appreciated that different structures may be utilized for enclosing sleeve 10. For example, sleeve 10 may be open on only one end in alternate embodiments.

In certain embodiments, the compartments may be attachable to the tray via magnetic attachment, wherein one of the tray or compartments is/are provided with a magnetic component, and the other one of the tray or compartments is/are made of or include a ferromagnetic metal or co-attractive magnetic component. In one embodiment, each container may include a magnetic attachment element 38 (e.g., a disk magnet or ferromagnetic metal) on the outer side of bottom wall 37A bottom surface, and the tray seat may include 7 corresponding magnetic attachment elements 18 affixed to bottom wall 12B and configured to magnetically attach to magnetic attachment elements 38 in each of the 7 containers when the containers are lined up within the seat of the tray. Magnetic attachment elements 18 and 38 are further positioned at intervals to force a precise alignment of containers 13 within tray 12. It shall be appreciated that in alternate embodiments, the magnetic attachment components may be omitted from the disclosed device and system. In some alternate embodiments, bottom wall 12B of the tray may be made entirely of a ferromagnetic metal configured to attract magnets 38 in containers 13.

Thus, the disclosed subject matter provides a pill storage system with a sleek design that is easy to carry during travel. The system allows a user to carry multiple pill containers as a combined unit, or to remove any one of the containers which may be carried (e.g., for a day's trip) by itself. The individual containers further provide separate storage for pills needed to be taken each day of the week, or otherwise needed to be stored separately so that a user may plan their course of pills for a week and be assured that he/she has taken their daily pills, or reminded that pills need to be taken. The separate containers and magnetic attachment system allow any container to be easily removed and securely reattached to the collective unit, allowing each container to be used separately or easily combined with the other containers. Additionally, the pill storage system provides an elegant and concealed design to remove the discomfort and possible embarrassment that certain individuals may feel in carrying a conventional pill container.

In one embodiment, tray 12 including side wall 15, and containers 13 may be made of polypropylene or other suitable plastic; first side walls 14 and ring 20 may be made of a silicone material, and sleeve 10 may be made of aluminum. It shall be appreciated however, that the device and system described herein may comprise any alternative known materials in the field and be of any size and/or dimensions.

It shall be appreciated that the disclosed system and components thereof can have multiple configurations in different embodiments. In certain embodiments, the system may be used for supplements, vitamins, and medications. However, in alternate embodiments, the system may be used for storage and transport of other material, including liquids and powders, or various small items such as sewing kit items, buttons, gemstones, coins, small jewelry, etc. It shall be appreciated that the disclosed device may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A pill storage system, comprising:

a multiple number of pill containers which are physically separated from one another, wherein each pill container includes a main container body and a lid configured to enclose the main container body;

an elongated tray configured to retain the multiple pill containers in a linear arrangement and adjacently aligned with respect to one another;

a tubular sleeve configured to slide over and snuggly encase the elongated tray and pill containers held within the elongated tray, such that the tubular sleeve and elongated tray create a compact and portable unit which securely holds the multiple pill containers in a fixed position, wherein the elongated tray includes a bottom wall, a first bracketing side wall and a second bracketing side wall that extend upwards from opposite side edges of the bottom wall, and a front rim which extend upwards from a front edge of the bottom wall, wherein the main container body of each pill container includes a front wall configured to face towards the front rim when the pill container is retained in the elongated tray, wherein the front rim of the elongated tray is shorter than the front wall of each pill container leaving more than half of the front wall of each pill container exposed when the pill container is retained within the elongated tray, and wherein each of the multiple pill containers is magnetically attachable to the bottom wall of the elongated tray.

2. The pill storage system of claim 1, wherein the elongated sleeve and each pill container has an essentially rectangular cross section.

3. The pill storage system of claim 1, wherein the pill storage system includes seven pill containers corresponding to seven days in a week.

4. The pill storage system of claim 3, wherein each pill container includes a label corresponding to a different day of the week.

5. The pill storage system of claim 1, wherein the length of the bottom seat corresponds to a summed length of the total number of pill containers when placed side by side according to said linear arrangement within the seat.

6. The pill storage system of claim 1, wherein the sleeve comprises two opposing open ends that are blocked by the first side wall and the second side wall when the sleeve encases the tray.

7. The pill storage system of claim 1, wherein each pill container includes a magnetic attachment element on its bottom surface, wherein the elongated tray includes multiple magnetic attachment elements at interval positions within the bottom wall of the elongated tray, wherein each magnetic attachment element in the elongated tray magnetically attracts to the magnetic attachment element in each pill container, and wherein the positioning of the magnetic attachment elements in the bottom wall of the elongated tray forces a compact alignment of the pill containers within the bottom wall.

8. The pill storage system of claim 1, wherein the elongated tray further includes a back rim which extends upwards from a back edge of the bottom wall opposite the front rim and in mirroring relationship thereto.

9. The pill storage system of claim 8, wherein each pill container is bracketed between the front rim and the back rim, wherein the multiple pill containers are configured to assemble along the bottom wall of the elongated tray into a row which is bracketed between the first side wall and the second side wall of the elongated tray.

10. The pill storage system of claim 1, wherein a label provided on the front wall of a respective pill container is visible when the pill container is retained within the elongated tray and the elongated tray and the tubular sleeve are disassembled from one another.

* * * * *